United States Patent
Zwaga et al.

(10) Patent No.: US 9,415,887 B2
(45) Date of Patent: Aug. 16, 2016

(54) METHOD FOR ARRANGING A FOIL IN A TRAY

(71) Applicant: Packable B.V., Almelo (NL)

(72) Inventors: Ronald Zwaga, Almelo (NL); Remi De Olde, Almelo (NL); Alain Wietse Bastiaan Tasma, Almelo (NL)

(73) Assignee: Packable B.V., Almelo (NL)

( * ) Notice: Subject to any disclaimer, the term of this patent is extended or adjusted under 35 U.S.C. 154(b) by 0 days.

(21) Appl. No.: 14/415,342

(22) PCT Filed: Jun. 14, 2013

(86) PCT No.: PCT/EP2013/062379
§ 371 (c)(1),
(2) Date: Jan. 16, 2015

(87) PCT Pub. No.: WO2014/012723
PCT Pub. Date: Jan. 23, 2014

(65) Prior Publication Data
US 2015/0217884 A1   Aug. 6, 2015

(30) Foreign Application Priority Data

Jul. 18, 2012   (EP) .................................. 12176915

(51) Int. Cl.
*B65B 7/28* (2006.01)
*B31B 1/00* (2006.01)
*B65D 77/20* (2006.01)
(Continued)

(52) U.S. Cl.
CPC ... *B65B 7/28* (2013.01); *B31B 1/00* (2013.01); *B32B 37/06* (2013.01); *B32B 37/10* (2013.01); *B32B 37/18* (2013.01); *B32B 38/0012* (2013.01); *B65B 9/04* (2013.01); *B65B 11/52* (2013.01); *B65B 31/028* (2013.01); *B65D 1/34* (2013.01); *B65D 5/2047* (2013.01); *B65D 5/563* (2013.01); *B65D 77/2024* (2013.01); *B31B 2201/2666* (2013.01); *B31B 2217/0053* (2013.01); *B31B 2217/0061* (2013.01); *B31B 2217/062* (2013.01); *B31B 2217/066* (2013.01);
(Continued)

(58) Field of Classification Search
CPC ........ B65B 7/28; B65B 11/52; B65B 31/028; B65B 9/04; B65D 1/34; B65D 77/2024; B65D 5/2047; B65D 5/563; B65D 2577/2025; B31B 1/00; B31B 2201/2666; B31B 2217/0053; B31B 2217/0061; B31B 2217/062; B31B 2217/066; Y10T 156/1002; B32B 37/06; B32B 37/10; B32B 37/18; B32B 38/0012; B32B 2439/00
See application file for complete search history.

(56) References Cited

FOREIGN PATENT DOCUMENTS

DE   4327669 A1   2/1995
EP   2441696 A1   4/2012

*Primary Examiner* — Michael C Miggins
(74) *Attorney, Agent, or Firm* — The Webb Law Firm

(57) ABSTRACT

Method for arranging a foil in a tray, comprising: providing a tray (1) having a bottom, an upright wall, a tray opening and a circumferential outwardly extending flange composed out of at least two abutting portions; providing a foil (7) having at least dimensions corresponding with the outer dimensions of the flange; heating a central zone (15) of the foil; urging the heated central zone of the foil against the bottom, the upright wall and at least partially over the flange, wherein the edge of the heated central zone runs over the interfaces of abutting portions. Intermediate product with a foil lying loose over a flange of the tray. Device comprising a mold (5) for receiving a tray (1), means for arranging a foil (7) over the mold, heating means comprising a plate which is arranged over the mold for heating the foil and means for urging the foil in the mold.

8 Claims, 5 Drawing Sheets

(51) Int. Cl.
*B65D 5/20* (2006.01)
*B65D 5/56* (2006.01)
*B65B 11/52* (2006.01)
*B65B 31/02* (2006.01)
*B65B 9/04* (2006.01)
*B32B 37/06* (2006.01)
*B32B 37/10* (2006.01)
*B32B 37/18* (2006.01)
*B32B 38/00* (2006.01)
*B65D 1/34* (2006.01)

(52) U.S. Cl.
CPC ..... *B32B 2439/00* (2013.01); *B65D 2577/2025* (2013.01); *Y10T 156/1002* (2015.01)

METHOD FOR ARRANGING A FOIL IN A TRAY

CROSS-REFERENCE TO RELATED APPLICATIONS

This application is the United States national phase of International Application No. PCT/EP2013/062379 filed Jun. 14, 2013, and claims priority to European Patent Application No. 12176915.2 filed Jul. 18, 2012, the disclosures of which are hereby incorporated in their entirety by reference.

BACKGROUND OF THE INVENTION

1. Field of the Invention

The invention relates to a method for arranging a foil in a tray, which method comprises:

providing a tray having a bottom with an upright wall, the upper edge defining a tray opening and with a circumferential outwardly extending flange;

providing a tray foil having at least dimensions corresponding with the outer dimensions of the circumferential flange;

heating a central zone of the tray foil;

urging the heated central zone of the tray foil against the bottom, the upright wall and at least partially over the outwardly extending flange.

2. Description of Related Art

Such a method is known from the prior art as described by European Patent application 2441696.

According to this publication a tray is provided folded out of a sheet of cardboard and having a flat flange. Then a tray foil is laminated in the tray to make the tray rigid and to keep the components of the cardboard tray together. The tray foil fully covers the flange of the tray.

Because the tray foil is heated for arranging the foil in the tray, the foil will still be warm, when the foil needs to be trimmed. Cutting a warm foil is virtually impossible compared to cutting cold foil.

Another difficulty of this known method, is that the folded components of the tray need to be positioned very accurately, especially the components forming the flange. If a small spacing is present between the components when arranging the tray foil, the heated tray foil will sag into this spacing providing a small channel. When a sealing is to be arranged on these parts, it is difficult to obtain an airtight seal due to these channels.

Thus, it is an object of the invention to reduce or even remove the above mentioned disadvantages.

SUMMARY OF THE INVENTION

This object is achieved with a method according to the preamble, which method is characterized in that the outwardly extending flange is composed out of at least two abutting portions and wherein the edge of the heated central zone runs over the interfaces of abutting portions.

By having the edge of the heated central zone running over the interfaces of abutting portions, it is ensured that the heated zone connects two abutting portions by adhering thereto.

Also a portion of the foil, which is not (yet) heated overlaps with the flange. This portion will not deform and will not form a channel when the abutting portions are not positioned correctly. So, the outer edge of the tray foil will stay flat, without any deformation, such that a subsequent sealing onto the tray foil will ensure an airtight seal.

A preferred embodiment of the method according to the invention further comprising the steps of:

filling the tray with a substance, for example foodstuff;

providing a sealing foil over the tray; and sealing the sealing foil on the flange by heating the sealing foil and the edge of the tray foil and pressing the foils on the flange of the tray.

When the sealing foil is sealed to the tray foil, both foils will be heated such that the adhere to each other. Also the outer edge of the tray foil, which was not yet heated before, will now adhere to the tray further improving the rigidity of the tray.

In a further preferred embodiment of the method according to the invention, the dimensions of the heated central zone are larger than the tray opening and are, at least along a portion of the edge of the zone, smaller than the dimensions of the outer edge of the outwardly extending flange.

So, according to this preferred embodiment, the edge of the heated zone will overlap with the inner edge of the flange, i.e. the tray opening. This ensures that a heated part of the foil will get into contact with the flange, which is necessary to keep the portions of the tray together.

By further ensuring, that the edge of the heated part does not extend beyond the outer edge of the flange, there will always be a non heated portion of the tray foil overlapping part of the flange. This non heated portion will be flat, without any channels caused by heating of the foil, to ensure an airtight sealing.

In yet another embodiment of the method according to the invention the central zone of the tray foil is heated to above the softening temperature, while the outer edge of the tray foil is maintained below the softening temperature.

The invention is also related to an intermediate product for a method according to the invention, wherein the intermediate product comprises:

a tray having a bottom with an upright wall, the upper edge defining a tray opening and with a circumferential outwardly extending flange, wherein the flange is composed out of at least two abutting portions; and a tray foil arranged against the bottom and the upright wall and at least partially over the outwardly extending flange wherein the edge of the tray foil is lying loose.

Preferably, the edge zone of the tray foil is adhered partially to the outwardly extending flange, when seen from the center of the tray outwardly to beyond the flange.

Thus, with a rectangular tray with a rectangular flange and when seen from the center outwardly, perpendicular to the length of the flange, the tray foil will be adhered over a part of the width of the flange, while the edge zone of the tray foil will be lying loose from the remaining part of the width of the flange.

The invention further relates to a device for arranging a foil in a tray according to any of the preceding claims, the device comprising:

a mould for receiving the tray;

supply means for arranging a foil over the mould;

heating means for heating the foil;

urging means for urging the heated foil in the mould;

wherein the heating means comprise a plate, which is arranged over the mould.

The plate of the heating means is used to heat the foil and also to press the foil and the flange of the tray to the mould, such that the tray is kept in position, when the foil is urged in the mould. The foil could for example be urged in the mould by under-pressure or over-pressure.

In a preferred embodiment of the device according to the invention, the mould comprises an elastic ring arranged adjacent and around the mould cavity for holding the tray and the foil. The elastic ring connects directly to the mould cavity and extends somewhat above the mould surface, such that the ring can be depressed by the plate of the heating means for holding the tray and the foil.

In yet another preferred embodiment of the device according to the invention, the plate of the heating means comprises at least two heating zones, for heating parts of the foil to different temperatures.

With the heating zones, it is possible to obtain different zones of stretchability in the foil. This is of advantage when the foil is urged in a deep cavity. By ensuring that the foil for the bottom part is somewhat colder than foil for the walls, an even thickness of the foil can be obtained.

The used foil for arranging in the tray can be a impermeable foil, but it could also be advantageous to use a micro perforated foil depending of the contents of the tray. Also the cover foil could be either an impermeable foil or a micro perforated foil, depending on the requirements.

BRIEF DESCRIPTION OF THE DRAWINGS

These and other features of the invention will be elucidated in conjunction with the accompanying drawings.

DETAILED DESCRIPTION OF THE INVENTION

Figure 1A:
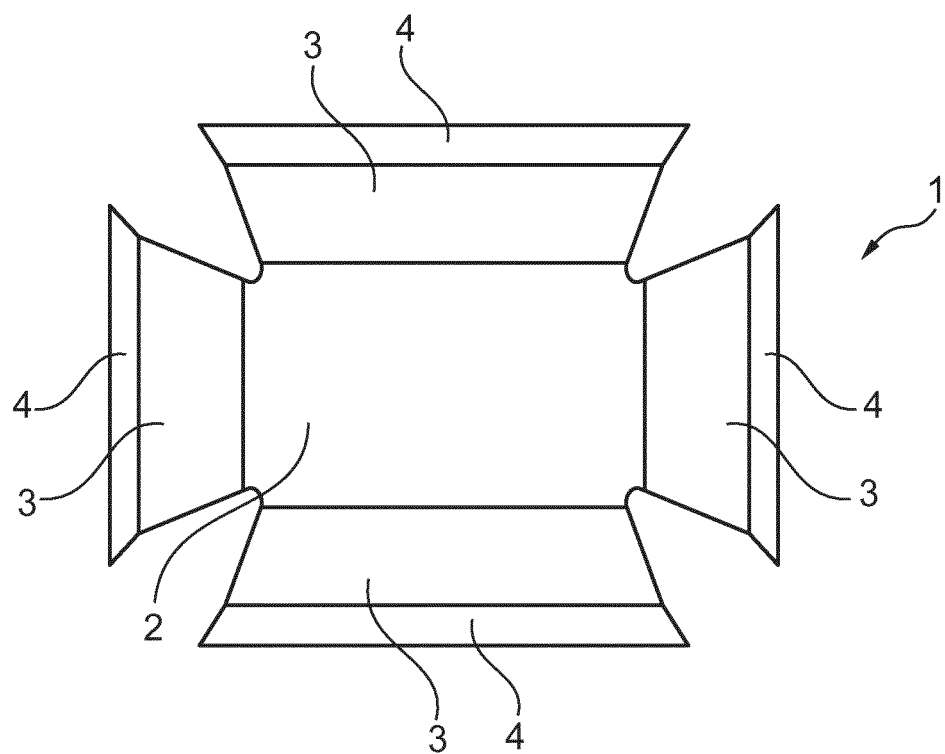
FIGS. 1A-1E show an embodiment of the method according to the invention.

FIG. 1A shows a cut unfolded sheet 1. This cut unfolded sheet 1 has a bottom 2, wall parts 3 and flange parts 4.

Figure 1B:
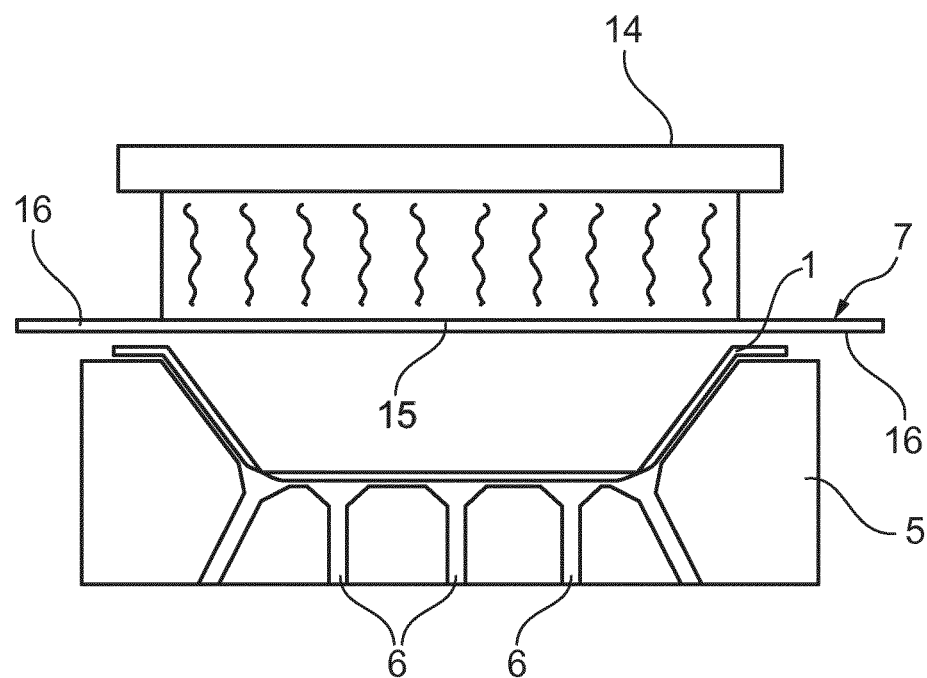

This cut and unfolded sheet 1 is moved over a mould 5 (see FIG. 1B) and pushed in the mould 5 by for example a tool (not shown) or by sucking the air through the primary suction opening 6. By pulling the unfolded sheet 1 into the mould, the sheet 1 is folded into the desired box shape.

Figure 1C:
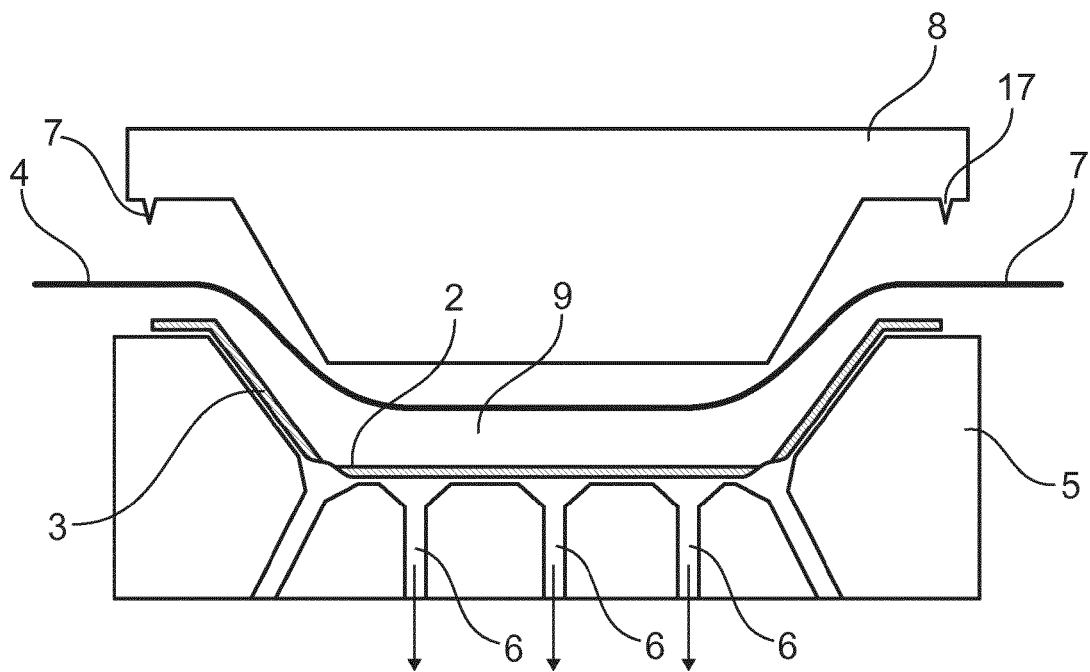

As soon as the sheet 1 is formed in the mould 5, a plastic tray foil 7 is transferred over the opening 9 in the box 1. The plastic tray foil 7 is heated by a heating means 14, such that only a central zone 15 is heated and can easily be deformed. (See FIG. 1C). The outer edge 16 of the tray foil 7 is not heated or at least maintained below a temperature, which ensures that the outer edge 16 cannot easily be deformed.

Figure 1D:
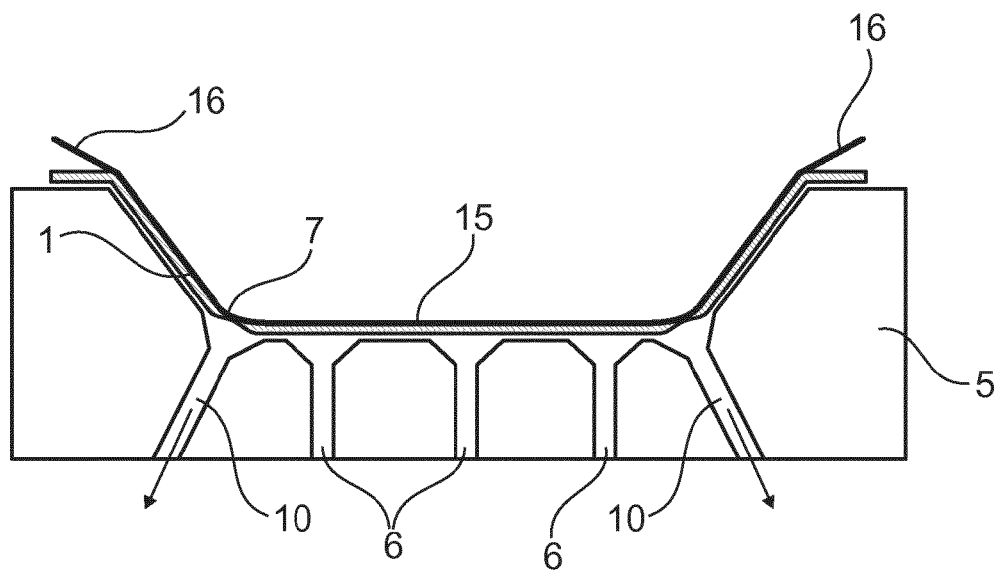
Figure 1E:
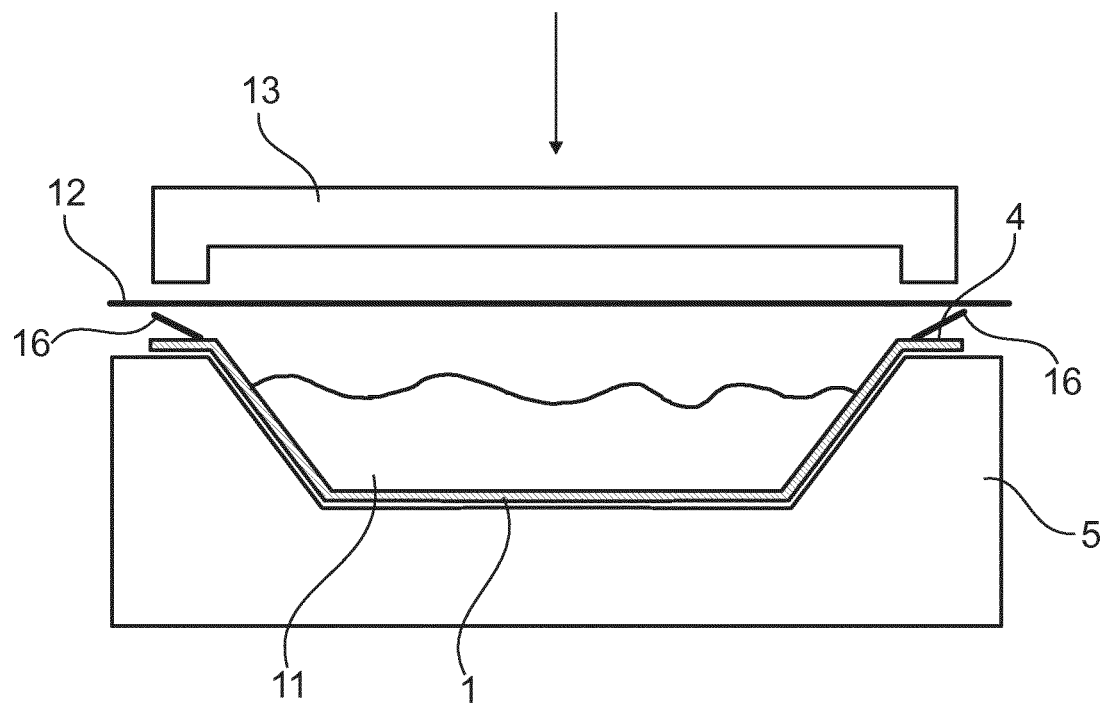

When the center zone 15 of plastic foil 7 is sufficiently heated, a counter mould 8 is pressed into the mould 5 and air is sucked through openings at the corner of the box 1 by the secondary suction openings 10 (see FIG. 1D). As a result low pressure is created in the space between the box 1 and the plastic foil 7. Due to this low pressure the plastic foil 7 is pressed against the bottom 2, wall parts 3 and flange parts 4. Simultaneously, the counter mould 8 is pressed into the mould 5, which provides additional pressure for pressing the plastic foil 7 against the bottom 2, the wall parts 3 and the flange parts 4.

The counter mould 8 is provided with a trimming knife 17 for trimming the plastic foil 7 along the edge of the circumferential flange 4. This trimming knife 17 engages on the outer edge 16 of the tray foil 7. Because the outer edge 16 is not heated, cutting the foil 7 is much more reliable.

The combination of box 1 and plastic tray foil 7 is then filled with foodstuff 11 and covered by a sealing foil 12. This sealing foil 12 is sealed to the circumferential flange 4 by a sealing tool 13. The sealing tool 13 will heat both the sealing foil 12 and the tray foil 7 including the outer edge 16. As a result, the sealing foil 12 will be airtight adhered to the tray foil 7 including the outer edge 16.

Before sealing the foil 7 to the flange 4 a gas, for example nitrogen, can be blown between the foodstuff 11 and the sealing foil 12, such that air is replaced by the gas.

Figure 2:
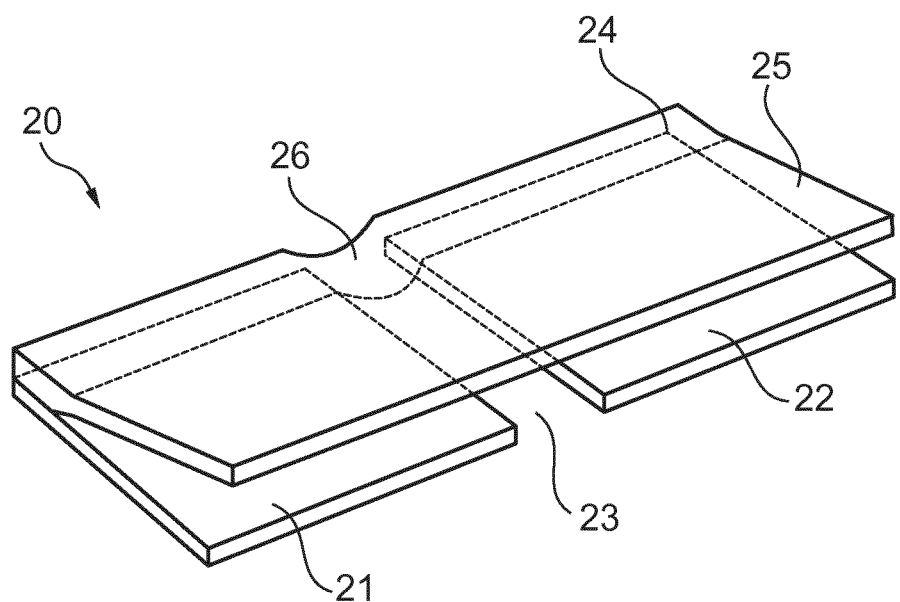
FIG. 2 shows a detailed view of an embodiment of the intermediate product according to the invention.

FIG. 2 shows a detail of an intermediate product 20 according to the invention. The intermediate product 20 has two horizontal flange parts 21, 22 which are not fully abutting and are having a space 23 in between.

The tray foil 24, 25 is adhered to the tray and a small portion of the flange parts 21, 22. An outer edge 25 of the tray foil is not heated and accordingly is lying loose from the flange parts 21, 22.

From FIG. 2, it is clear that the central portion 24 of the tray foil, which is heated for adhering to the tray and flange parts 21, 22, will sag into the space 23 and provide a small channel 26. However, because the outer edge 25 of the foil is not heated and is lying loose from the flange parts, this channel 26 will not extend to the outer edge of the foil, such that still a reliable sealing of a sealing foil is possible.

Figure 3:
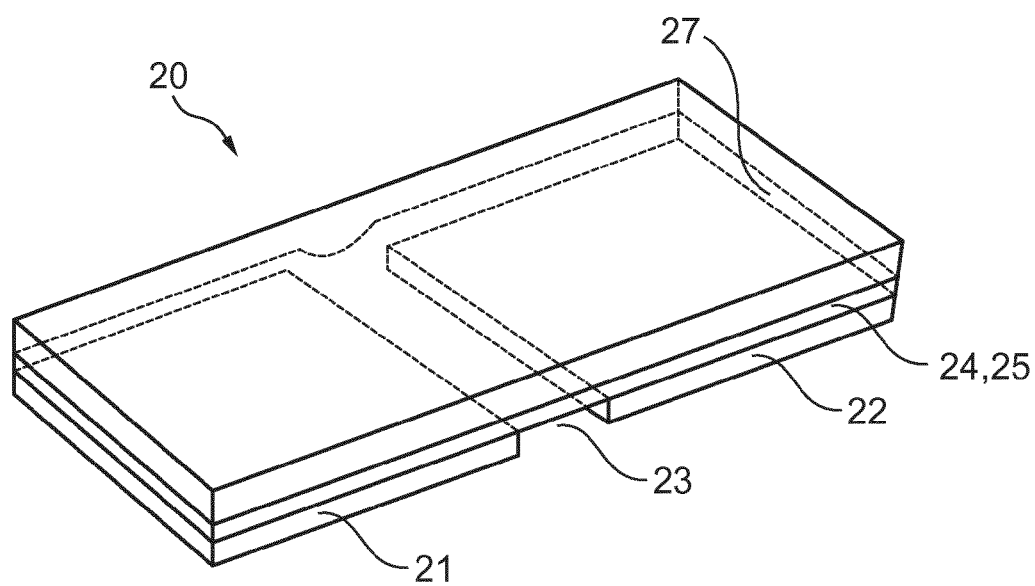
FIG. 3 shows the detailed view of FIG. 2 with a top foil arranged.

FIG. 3 shows the intermediate product 20 with a top foil 27 arranged to the tray foil 24, 25. The top foil 27 is sealed and due to the sealing heat, the tray foil 25 will also adhere to the flange parts 21, 22.

Figure 4:
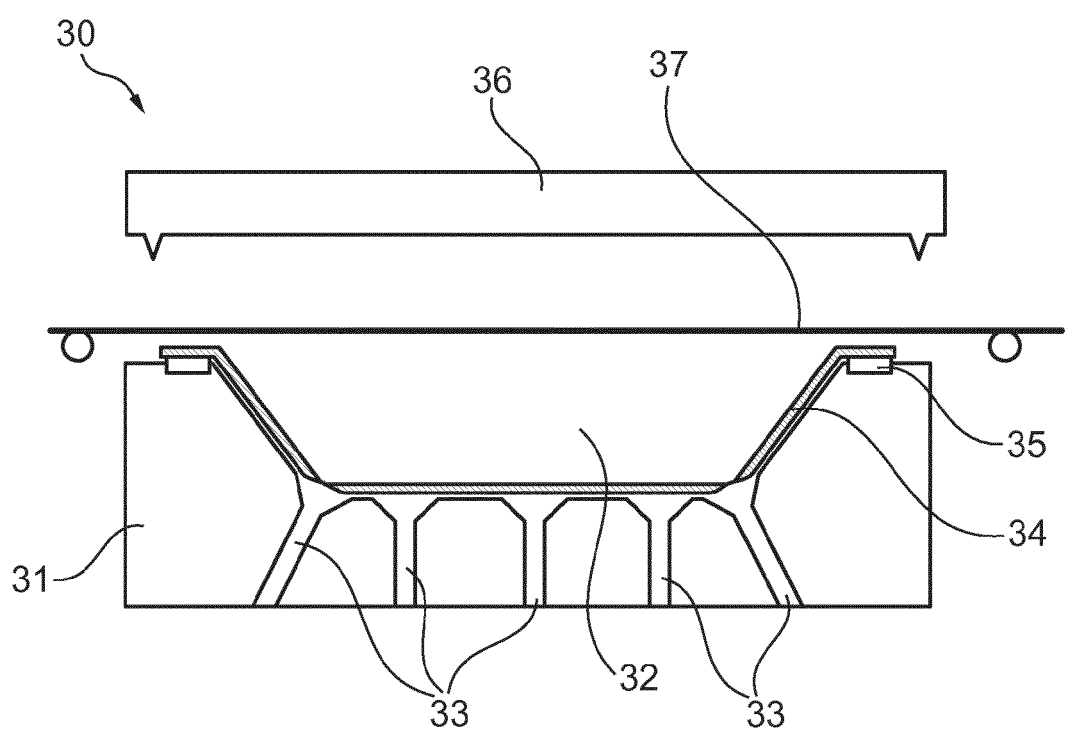
FIG. 4 shows an embodiment of the device according to the invention in a first position.

FIG. 4 shows a device 30 according to the invention. This device 30 has a mould 31 with a mould cavity 32. The mould 31 is provided with suction channels 33 for creating an underpressure to urge a tray 34 into the mould 31.

An elastic ring 35 is arranged around and adjacent the mould cavity 32. When the heating plate 36 is pressed on the mould 31 (see FIG. 5), the elastic ring 35 provide sufficient counter pressure to hold the tray 34 and the foil 37.

Figure 5:
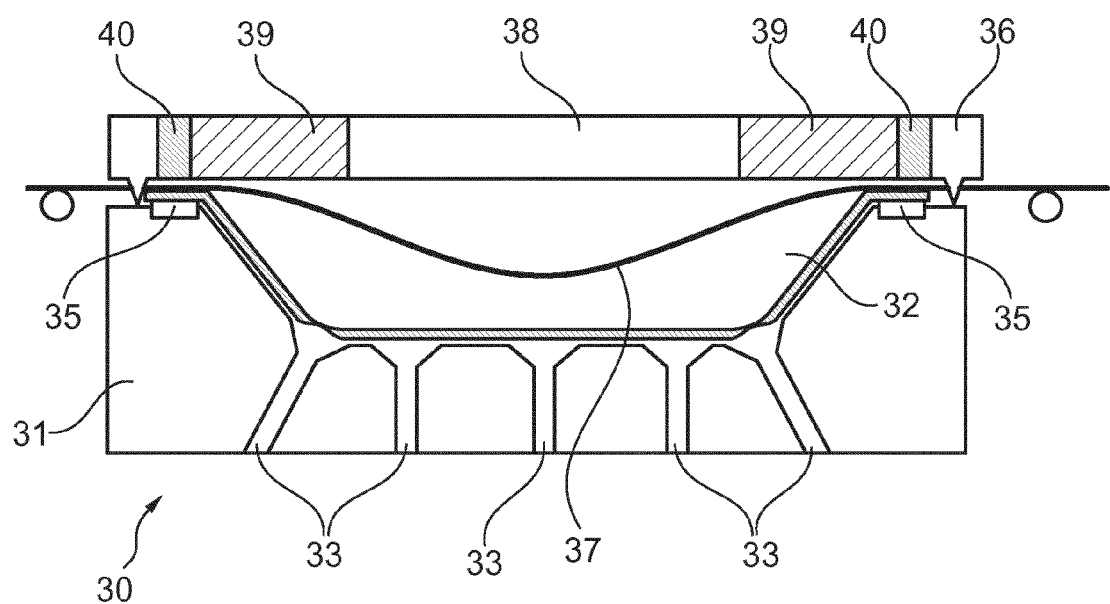
FIG. 5 shows the embodiment of FIG. 4 in a second position.

As shown in FIG. 5, the heating plate 36 could be provided with heating zones 38, 39, 40. These different heating zones 38, 39, 40 can heat zones of the foil 37 to different temperatures, such that for example the center part, heated by zone 38 stretches less, than the wall parts, heated by zone 39.

By cooling zone 40 or by refraining from heating, it is possible to have a cold foil edge, such as explained with regard to FIGS. 1A-1D.

The invention claimed is:

1. A method for arranging a foil in a tray, which method comprises:
   providing a tray having a bottom with an upright wall, the upper edge defining a tray opening and with a circumferential outwardly extending flange;
   providing a tray foil having at least dimensions corresponding with the outer dimensions of the circumferential flange;
   heating a central zone of the tray foil; and
   urging the heated central zone of the tray foil against the bottom, the upright wall and at least partially over the outwardly extending flange,
   wherein the outwardly extending flange is composed out of at least two abutting portions and wherein the edge of the heated central zone runs over the interfaces of abutting portions; and
   wherein the dimensions of the heated central zone are larger than the tray opening and are, at least along a portion of the edge of the zone, smaller than the dimensions of the outer edge of the outwardly extending flange.

2. The method according to claim 1, further comprising the steps of:
   filling the tray with a substance, for example foodstuff;
   providing a sealing foil over the tray; and
   sealing the sealing foil on the flange by heating the sealing foil and the edge of the tray foil and pressing the foils on the flange of the tray.

3. The method according to claim 1, wherein the central zone of the tray foil is heated to above the softening temperature, while the outer edge of the tray foil is maintained below the softening temperature.

4. An intermediate product for a method according to claim 1, wherein the intermediate product comprises:
   a tray having a bottom with an upright wall, the upper edge defining a tray opening and with a circumferential outwardly extending flange, wherein the flange is composed out of at least two abutting portions; and
   a tray foil arranged against the bottom and the upright wall and at least partially over the outwardly extending flange wherein the edge of the tray foil is lying loose.

5. The intermediate product according to claim 4, wherein the edge zone of the tray foil is adhered partially to the outwardly extending flange, when seen from the center of the tray outwardly to beyond the flange.

6. A device for arranging a foil in a tray according to claim 1, the device comprising:
   a mould for receiving the tray;
   supply means for arranging a foil over the mould;
   heating means for heating the foil; and
   urging means for urging the heated foil in the mould;
   wherein the heating means comprise a plate, which is arranged over the mould.

7. The device according to claim 6, wherein the mould comprises an elastic ring arranged adjacent and around the mould cavity for holding the tray and the foil.

8. The device according to claim 6, wherein the plate of the heating means comprises at least two heating zones, for heating parts of the foil to different temperatures.

* * * * *